(12) United States Patent
Noh

(10) Patent No.: US 8,996,580 B2
(45) Date of Patent: Mar. 31, 2015

(54) APPARATUS AND METHOD FOR GENERATING MULTIMEDIA PLAY LIST BASED ON USER EXPERIENCE IN PORTABLE MULTIMEDIA PLAYER

(75) Inventor: Yoo-Mi Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 561 days.

(21) Appl. No.: 12/838,718

(22) Filed: Jul. 19, 2010

(65) Prior Publication Data

US 2011/0099209 A1 Apr. 28, 2011

(30) Foreign Application Priority Data

Oct. 22, 2009 (KR) .................. 10-2009-0100629

(51) Int. Cl.
*G06F 7/00* (2006.01)
*G06F 17/30* (2006.01)
*G11B 27/10* (2006.01)
*G11B 20/10* (2006.01)

(52) U.S. Cl.
CPC .... G11B 27/105 (2013.01); *G11B 2020/10537* (2013.01)
USPC ............................ 707/793; 707/748; 707/752

(58) Field of Classification Search
USPC ................... 707/791, 793, 796, 736
See application file for complete search history.

(56) References Cited

U.S. PATENT DOCUMENTS

| | | | |
|---|---|---|---|
| 7,767,896 B2 * | 8/2010 | Kameyama | 84/600 |
| 8,134,063 B2 * | 3/2012 | Hosoi | 84/615 |
| 2006/0093998 A1 * | 5/2006 | Vertegaal | 434/236 |
| 2006/0167576 A1 * | 7/2006 | Rosenberg | 700/94 |
| 2009/0077160 A1 * | 3/2009 | Svendsen et al. | 709/203 |
| 2009/0088877 A1 * | 4/2009 | Terauchi et al. | 700/94 |
| 2009/0327035 A1 * | 12/2009 | Allard | 705/10 |
| 2010/0070456 A1 * | 3/2010 | Sugihara et al. | 706/54 |
| 2010/0077017 A1 * | 3/2010 | Martinez et al. | 709/201 |
| 2011/0046955 A1 * | 2/2011 | Ikeda et al. | 704/260 |
| 2011/0169603 A1 * | 7/2011 | Fithian et al. | 340/5.52 |

FOREIGN PATENT DOCUMENTS

| | | |
|---|---|---|
| JP | 2006-092430 A | 4/2006 |
| JP | 2008-176851 A | 7/2008 |
| KR | 10-0748918 B1 | 8/2007 |
| KR | 10-2009-0032326 A | 4/2009 |
| KR | 10-2009-0033750 A | 4/2009 |
| KR | 10-2010-0027457 A | 3/2010 |

\* cited by examiner

*Primary Examiner* — Robert W. Beausoliel, Jr.
*Assistant Examiner* — Hexing Liu
(74) *Attorney, Agent, or Firm* — Jefferson IP Law, LLP

(57) ABSTRACT

An apparatus and method for generating a multimedia play list based on user experiences in a portable multimedia player are provided. The apparatus includes an analyzer for analyzing user experience information input to the multimedia player, a recorder for recording the user experience information in a multimedia tag, a play list generator for generating a play list by analyzing the user experience information and the multimedia tag information recorded by the recorder, and a reproduction unit for reproducing multimedia according to the generated play list.

11 Claims, 8 Drawing Sheets

APPARATUS AND METHOD FOR GENERATING MULTIMEDIA PLAY LIST BASED ON USER EXPERIENCE IN PORTABLE MULTIMEDIA PLAYER

PRIORITY

This application claims the benefit under 35 U.S.C. §119(a) of a Korean patent application filed in the Korean Intellectual Property Office on Oct. 22, 2009 and assigned Serial No. 10-2009-0100629, the entire disclosure of which is hereby incorporated by reference.

BACKGROUND OF THE INVENTION

1. Field of the Invention

The present invention relates to an apparatus and method for generating a play list in a portable multimedia player. More particularly, the present invention relates to an apparatus and method for analyzing a user experience pattern by using various means and for generating a play list according to the experience pattern.

2. Description of the Related Art

With the widespread use of terminals (e.g., MPEG-1 Audio Layer 3 (MP3) players, mobile phones, Portable Media Players (PMP), etc.) as portable devices for listening to music, data compression techniques and data storage media have been developed. As a result, the terminals can store hundreds of music files.

According to a method of playing back music files stored in the terminal by a user, a plurality of songs are played back by selecting only one song or by selecting several songs contiguously. Examples of the method of continuously playing back the plurality of songs include playing back songs sequentially in the order of the songs stored in the terminal according to a specific rule, playing back songs in a shuffle mode, and sequentially playing back a plurality of songs selected by the user. When songs are played back in the shuffle mode, the plurality of songs stored in an MP3 player is played back in a random sequence. When using the aforementioned three methods for playing back the plurality of songs, the terminal generates a play list which indicates an order of the plurality of songs to be continuously played back, and plays back the plurality of songs included in the generated play list.

FIG. 1 is a flowchart illustrating the conventional method of managing a multimedia play list.

Referring to FIG. 1, when a music file is stored in a multimedia player such as an MP3 player in step 100, an album title, a singer's name, or the like may be pre-recorded in each music file tag or may be manually written by a user in step 110. The play list can be generated according to information existing in the music file tag in step 120. For example, if the singer's name is set to 'John Doe' in the play list, a music file in which the singer's name is 'John Doe' is inserted to the play list by filtering each music file's tag. In this case, if there is no content recorded in the tag, filtering is not performed correctly. Therefore, in order to perform correct filtering, the user has to manually write information of a specific music file to the tag.

FIG. 2 is a flowchart illustrating a conventional management method including a process of selecting a stored music file directly by a user.

Referring to FIG. 2, although a music file may be stored in a multimedia player such as an MP3 player in step 200 and the user may select the desired music file in step 202, there is a disadvantage in that the user has to manually select a music file to be included in the play list after searching many music files one by one, and has to re-create the play list when the user desires to listen to music of other genres in step 204.

In addition, since the conventional multimedia player plays back songs in the same order as that of storing songs or plays back the songs in the shuffle mode, the user cannot listen to the desired music immediately, and several key manipulations are inevitable, which result in user inconvenience. When the user pre-selects a plurality of songs, the user has to individually select the plurality of songs while viewing a menu, which leads to inconvenience of multiple key manipulations. The method of generating the play list according to a user's preference also has a problem in that the list may include an item not desired by the user since the list is not written based on objective data. Furthermore, since standardized items (e.g., artist, title, genre, etc.) can be input to tag information of a music file, there is a disadvantage in that a variety of tag information cannot be input.

SUMMARY OF THE INVENTION

An aspect of the present invention is to address at least the above-mentioned problems and/or disadvantages and to provide at least the advantages described below. Accordingly, an aspect of the present invention is to provide an apparatus and method for generating a play list in a portable multimedia player.

Another aspect of the present invention is to provide an apparatus and method for recording a user experience pattern obtained using various sensors and for generating a play list according to the experience pattern in a portable multimedia player.

Another aspect of the present invention is to provide an apparatus and method for generating a multimedia play list by using location information, surrounding situations, and user's operation information in a portable multimedia player.

In accordance with an aspect of the present invention, an apparatus for generating a play list in a portable multimedia player is provided. The apparatus includes an analyzer for analyzing user experience information input to the multimedia play apparatus, a recorder for recording the user experience information in a multimedia tag, a play list generator for generating a play list by analyzing the user experience information and the multimedia tag information recorded by the recorder, and a reproduction unit for reproducing multimedia according to the generated play list.

In accordance with another aspect of the present invention, a method of generating a play list in a portable multimedia player is provided. The method includes sensing user experience information via a sensor, analyzing the user experience information according to the sensed information, recording the analysis result in a multimedia tag, generating a play list by comparing information recorded in the tag of a multimedia file with experience information currently analyzed, and reproducing multimedia files in the play list.

In accordance with another aspect of the present invention, a method of reproducing multimedia files in a portable multimedia player is provided. The method includes sensing, by a sensor of the portable multimedia terminal, external conditions of the multimedia player, generating a playlist of multimedia files based on the sensed external conditions, and reproducing multimedia files included in the generated playlist.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an apparatus and method for analyzing a user experience pattern by using various means and for generating a play list according to the experience pattern in a portable multimedia player will be described. Although music will be exemplified in the following description as multimedia, the technical features of present invention are not limited only to the music.

Figure 1:
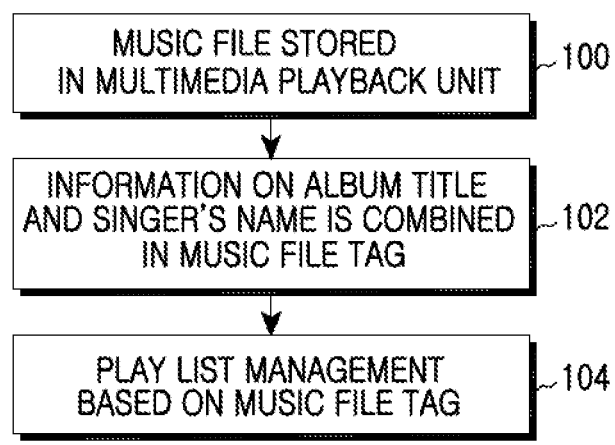
FIG. 1 is a flowchart illustrating a conventional method of managing a multimedia play list.
Figure 2:
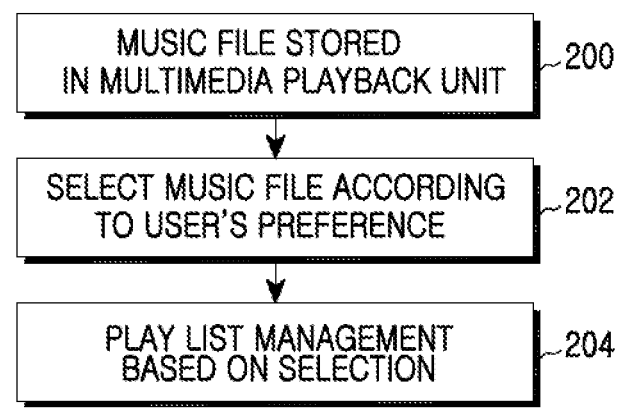
FIG. 2 is a flowchart illustrating a conventional management method including a process of selecting a stored music file directly by a user.
Figure 3A:
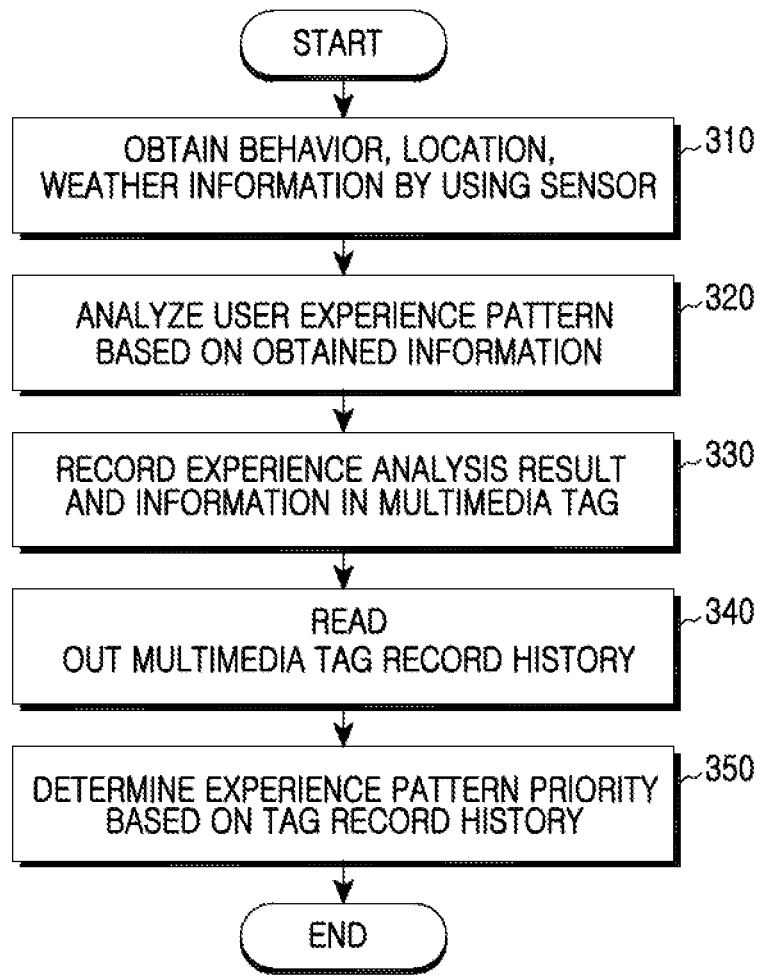
FIG. 3A is a flowchart illustrating an operation of updating a multimedia tag based on user experience in a portable multimedia player according to an exemplary embodiment of the present invention.
Figure 3B:
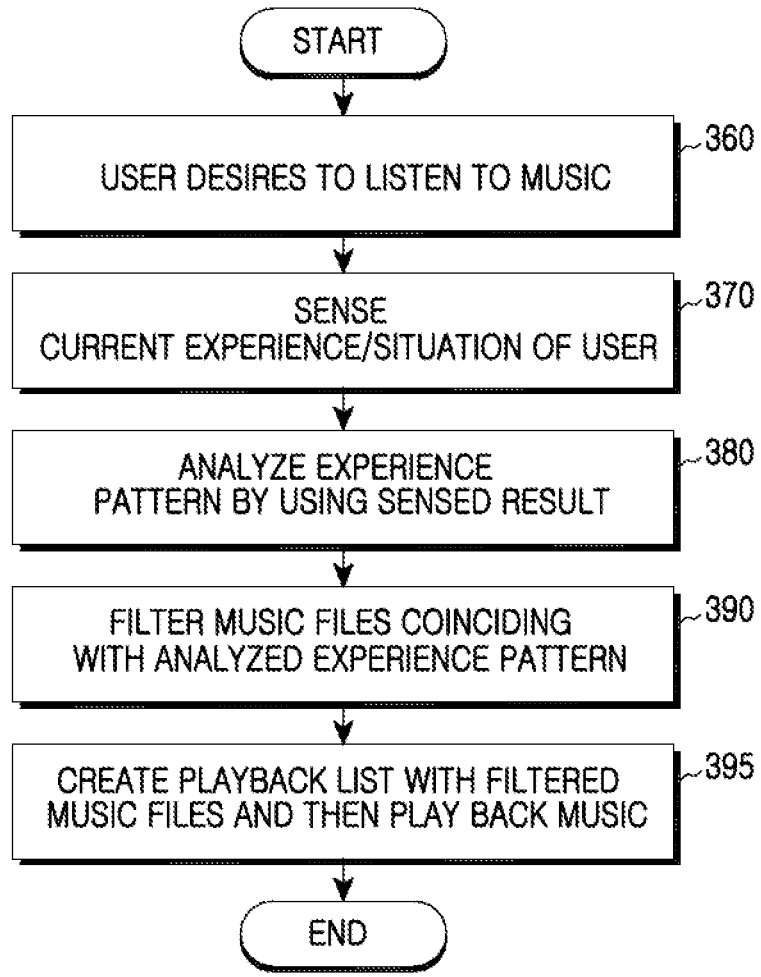
FIG. 3B is a flowchart illustrating an order of generating a play list automatically by sensing user experiences and situations sensed by a portable multimedia player according to an exemplary embodiment of the present invention.

FIG. 3A and FIG. 3B illustrate an operational flow of a portable multimedia player according to exemplary embodiments of the present invention. The portable multimedia player of the present invention may employ various sensors. In addition, the portable multimedia player employs a component for receiving external information which periodically changes by communication and web services.

FIG. 3A is a flowchart illustrating an operation of updating a multimedia tag based on user experience in a portable multimedia player according to an exemplary embodiment of the present invention.

Referring to FIG. 3A, the multimedia player senses information input from a sensor included in the multimedia player and from an external information receiver in step 310, and thereafter analyzes a current user state by using an analyzer based on the sensed information or analyzes a current situation in step 320. The multimedia player analyzes a user experience pattern. For example, a user location, a current weather (or atmosphere), a user activity may be analyzed.

In step 330, based on the analysis result, the multimedia player allows a recorder to record the user experience pattern in a tag of music which is currently being played back. The recorded information may be the analysis result information or raw data sensed by the sensor and the external information receiver. Alternatively, both the analysis result and the raw data may be recorded. The multimedia player reads out the information which has been recorded in the tag before or after being recorded by the recorder in step 340, and determines a priority of the information according to the experience pattern based on a history of the information recorded in the tag in step 350. For example, if no information is recorded in the tag, current information is recorded. Otherwise, if the history shows that there is information previously recorded in the tag, the information is combined with the current information and then an experience pattern having a top priority is determined for a specific music file.

Thereafter, a specific item is recorded according to the priority of the experience pattern. For example, if Global Positioning System (GPS) information is pre-recorded three times in a tag of music currently listened to by the user and indicates seashore where the user listened to the music in the past, and current GPS information is recorded therein and indicates that the user is currently listening to the music downtown, then the seashore is stored in a place tag with a top priority. When information is recorded in the tag, the information may be registered automatically when analysis of the user experience pattern is complete. The user may input a specific command to register a result of the experience pattern. For example, when the user presses an "experience pattern add" button while listening to music, a result of the experience pattern may be registered based on current GPS information or the like.

FIG. 3B illustrates an order of generating a play list by utilizing tag information when a user intends to listen to music in a portable multimedia player according to an exemplary embodiment of the present invention.

Referring to FIG. 3B, when the user desires to listen to music in step 360, the multimedia player senses a specific experience of the user or a specific situation of the user using a sensor included in the multimedia player and by using obtained information in step 370. The multimedia player analyzes a user experience pattern based on the sensing result in step 380. In this case, the multimedia player may determine that the user desires to listen to music when a menu (e.g., "play automatically generated list", etc.) is selected. In step 390, the multimedia player employs a play list generator to filter music files having a first priority among the music files having tag information coinciding with the analyzed experience pattern. The play list generator may filter the music files based on the analyzed experience pattern. In step 395, the multimedia player automatically generates a play list with the filtered music files, and allows a play unit (or reproduction unit) to reproduce music files included in the play list. If the number of music files automatically filtered is too small, music files having a second priority according to the analyzed experience pattern may be added, and in this case, the user may select how many music files may be listed by one-time selection in a user setting.

In the aforementioned description, the play list may be created on a real time basis according to a situational change. For example, when the user listens to music near seashore and then moves to another place, the play list may be re-generated by considering the changed place.

Figure 4:
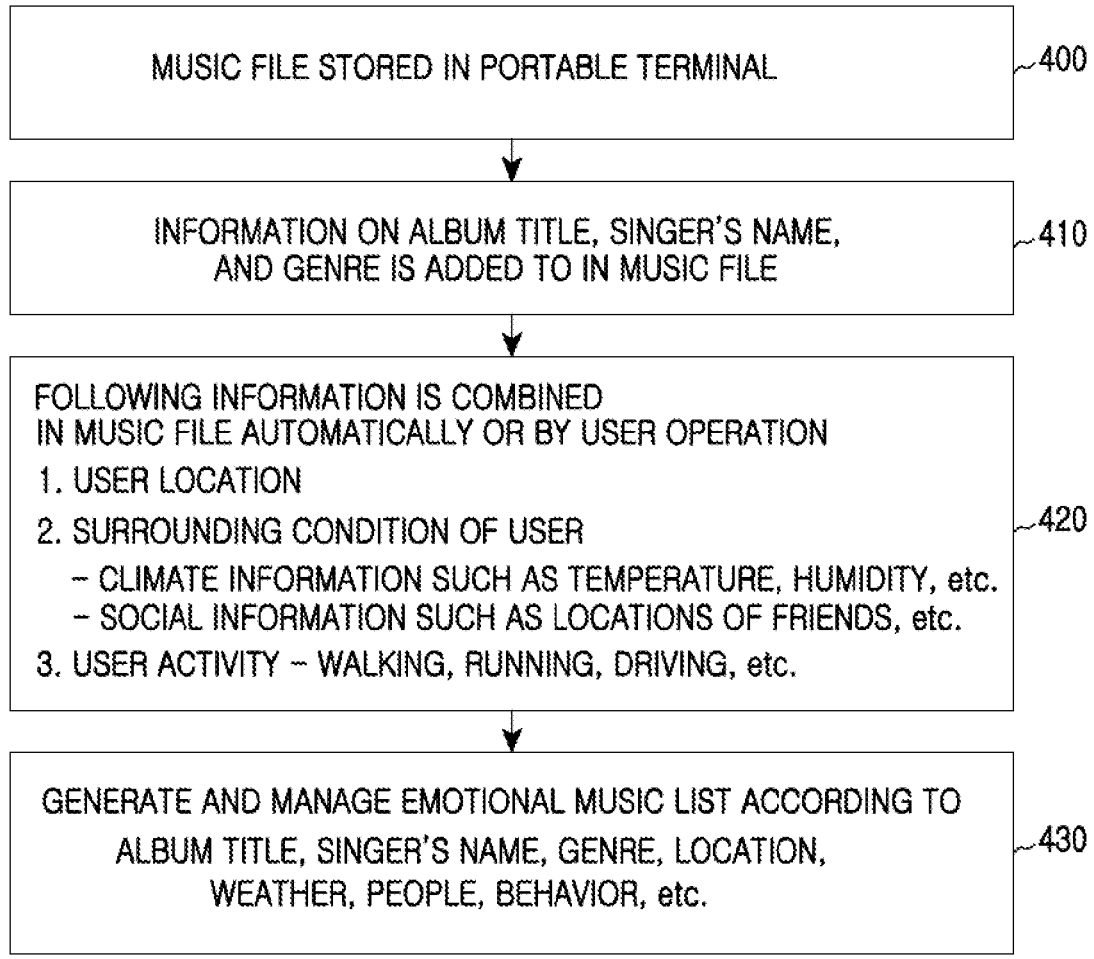
FIG. 4 is a flowchart illustrating a process of combining information updated to an existing tag in a multimedia file according to an exemplary embodiment of the present invention.

FIG. 4 is a flowchart illustrating a process of combining information updated to an existing tag in a multimedia file according to an exemplary embodiment of the present invention.

Referring to FIG. 4, a portable multimedia player according to exemplary embodiments of the present invention may record user location information, surrounding condition information (e.g., temperature, humidity, friends, atmosphere, etc.) and user activity information (e.g., walking, running, driving, etc.) irrespective of contents previously recorded in the music file tag. A currently sensed experience pattern and information may be recorded in any case where the music file tag has no contents or where previously recorded contents exist.

In step 400, one or more music files are stored in the portable terminal In step 410, various information, such as an album title, singer's name, genre, and the like, are added to the music file. The information can be added as multimedia tags. In step 420, additional information is added to the music file. The additional information may be user location information, surrounding condition information (e.g., temperature, humidity, friends, atmosphere, etc.) and user activity information (e.g., walking, running, driving, etc.), and the like. Finally, in step 430, a play list can be generated according to the information gathered in steps 410 and 420.

Figure 5:
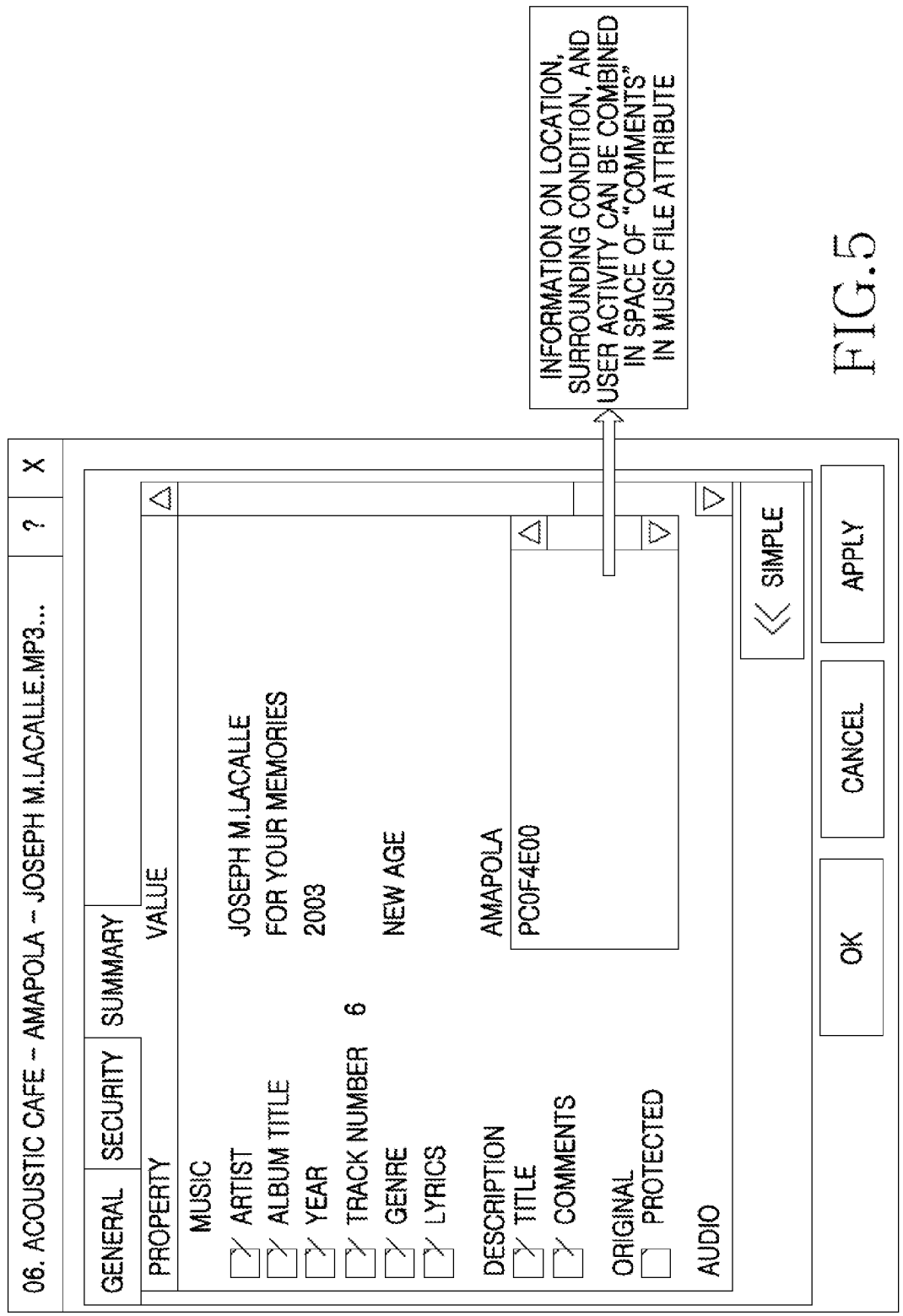
FIG. 5 illustrates an example of space for recording a tag based on a user experience according to an exemplary embodiment of the present invention.

FIG. 5 illustrates an example of a window for combining and recording the experience pattern and information according to an exemplary embodiment of the present invention.

Referring to FIG. 5, when music stored in a multimedia player is played back in a specific place, location information of the place may be automatically added to a file of the music. If a user only listens to a first part of the music and then selects a next song, it may be determined that the user does not desire to listen to the music in the current place and thus location information may not be added. Such a determination criterion may equally apply when another information (e.g., weather, acquaintance, activity, etc.) to be mentioned below is added. If the location information continuously changes while a music file is being played back, it implies that the user is moving, and thus user activity may be added instead of the location information. Further, the user may generate or select a location category of a preferred place for listening to music (e.g., seashore, park, etc.) and then add the selection result to the music file. In a method of updating tag information of the file, content may be stored in a temporary storage space and tag information may be updated when the play of the file ends, because the file information cannot be modified while the file is being played back.

The user may use the location information to search and sort music files in which location information is combined. Therefore, the user may easily recognize music listened to in a specific place, such as "music listened to in the seashore", "music listened to in the park", "music listened to in the school library", etc.

Figure 6:
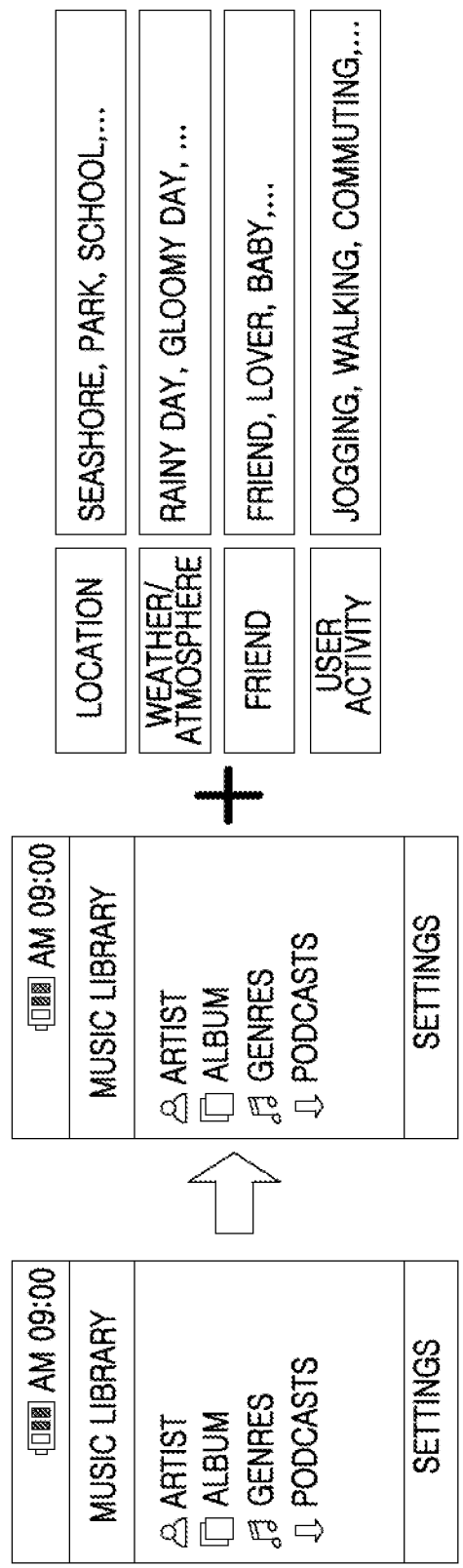
FIG. 6 illustrates an example of a music library screen capable of sorting and searching according to a classification based on a user experience according to an exemplary embodiment of the present invention.
Figure 7:
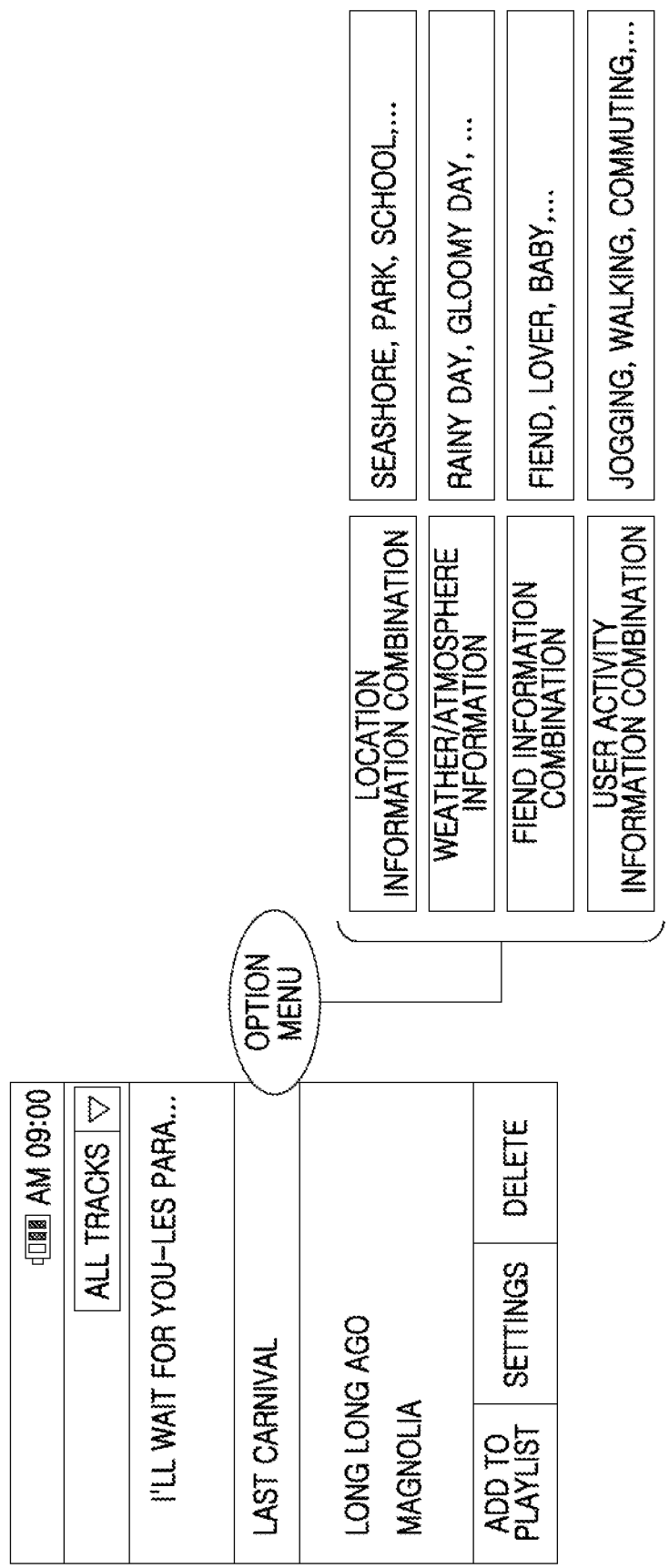
FIG. 7 illustrates an example of selecting any multimedia file and combining user experience tag information by a user according to an exemplary embodiment of the present invention.

FIG. 6 illustrates an example in which a music file combined with several pieces of added information may be sorted and searched for from a music library. FIG. 7 illustrates an example in which a user selects any music file and combines a variety of information in a music file tag.

Referring to FIGS. 6 and 7, a play list may be generated on a real time basis automatically in exemplary embodiments of the present invention. Further, a tag list may be diversified. Data of ambient temperature, humidity, and pressure may be measured by a sensor (e.g., thermometer, hygrometer, barometer, etc.) equipped in the portable terminal to determine weather or atmosphere when a music file is played back. The determination result may be added to the music file. Further, the user may generate or select a weather category (e.g., rainy day, cloudy day, etc.) and then add the selected weather category to the music file. The user may search for and sort the music file having weather and atmosphere information according to weather or the like, and as a result, may easily recognize music desired to be listened to in specific weather or atmosphere, such as "music for rainy weather", "music for gloomy weather", and "music for sunny and bright weather".

As a method of scanning a Bluetooth device address when music is played back, information obtained by determining to whom the user listens to the music may be added to a music file. Alternatively, the user may search for a person stored in a phone book and then may combine information on the person in the music file. The user may search and sort the music file to which social information of 'who' is added according to a name of the person or a relation, or the like, and thus may easily know music which the user desires to listen to with someone or music which reminds the user of someone such as "music which the user enjoys listening to with a boyfriend" and "music which a mother enjoys".

Data measured by using a sensor (e.g., accelerator, etc.) equipped in the mobile phone and location information received from a GPS receiver may be used to determine a user activity. The user activity may be classified into walking (or stroll), running (or jogging), driving (or commuting), etc., and the content of the classification may be combined in the music file. Alternatively, the user may generate and select an activity category and combine the category in the music file.

The user may search or sort the music file to which the activity information is added according to an activity name, and thus may easily recognize music which the user enjoys listening to when doing a specific action, such as "music for jogging", "music for commuting", etc.

When a play list is generated using the aforementioned methods, the user may avoid inconvenient tasks, for example, inputting tag-related information one by one, or searching and selecting all stored multimedia files to generate the play list. Further, various sensors and information are utilized to recognize which experience the user is having, and the result is recorded in a tag as a history and the content of the record is analyzed. Therefore, when specific multimedia is most preferred by the user, a specific experience which the user is having may be recognized correctly. Furthermore, in addition to the standardized tag information, a variety of information (e.g., weather, atmosphere, places, personal connections, etc.) may be added to the multimedia files, and thus the play list may be generated by classifying the multimedia according to the variety of information. When the user is continuously having a certain experience, the play list may be updated on a real time basis according to a varying experience pattern.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for generating a play list in a portable multimedia player, the apparatus comprising:
    a hardware controller configured to execute one or more modules;
    a sensor for sensing user experience information input to the multimedia player via physical characteristics that the multimedia player is exposed to; and
    a storage unit for storing the one or more modules,
    wherein the one or more modules comprises:
        an analyzer for analyzing the user experience information input;
        a recorder for recording the user experience information in a multimedia tag of a multimedia file which is currently being played back;
        a play list generator for generating a play list based on the analyzed user experience information and the multimedia tag information recorded by the recorder; and
        a reproduction unit for reproducing the multimedia file according to the generated play list,
    wherein the sensor obtains information periodically from a web service in association with web information, and
    wherein the analyzer determines a user experience pattern based on raw data sensed by the sensor based on a physical activity of a user and the information from the web service, and
    wherein information obtained periodically from the web service comprises at least one of weather information and personal bio-rhythm.

2. The apparatus of claim 1, wherein the sensor comprises at least one of a Global Positioning System (GPS) sensor, an acceleration sensor, a humidity sensor, a pressure sensor, and a Bluetooth device scanner.

3. The apparatus of claim 2, wherein, if previously recorded information exists in the tag information, the recorder determines a priority of the user experience pattern by analyzing a history of the previously recorded information.

4. The apparatus of claim 3, wherein the play list generator determines a play list by comparing the user experience information analyzed by the analyzer and information corresponding to a specific priority or lower among the previously recorded information.

5. The apparatus of claim 1, wherein the recorder uses at least one of a method of automatically recording an analysis result of the analyzer and a method of recording the analysis result of the analyzer when a specific signal is generated by performing a specific input by a user.

6. A method of generating a play list in a portable multimedia player, the method comprising:
    sensing user experience information of physical characteristics that the multimedia player is exposed to via a sensor;
    analyzing the user experience information according to the sensed information;
    recording the analysis result in a multimedia tag of a multimedia file which is currently being played back;
    generating a play list by comparing information recorded in a multimedia tag of a multimedia file with the analyzed user experience information; and
    reproducing multimedia files in the play list,
    wherein, the sensing of the user experience information comprises periodically obtaining the user experience information from a web service in association with web information using the sensor, and
    wherein information obtained periodically from the web service comprises at least one of weather information and personal bio-rhythm.

7. The method of claim 6, wherein the user experience information is sensed using at least one of a Global Positioning System (GPS) sensor, an acceleration sensor, a humidity sensor, a pressure sensor, and a Bluetooth device scanner.

8. The method of claim 6, wherein the analyzing of the user experience information according to the sensed information comprises determining a user experience pattern based on raw data sensed by the sensor.

9. The method of claim 8, wherein the recording of the analysis result in the multimedia tag comprises, if previously recorded information exists in the tag information, determining a priority of the user experience pattern by analyzing a history of the previously recorded information.

10. The method of claim 9, wherein the generating of the play list comprises determining the play list by comparing the analyzed user experience information with information corresponding to a specific priority or lower among the previously recorded information.

11. The method of claim 6, wherein, in the recording of the analysis result in the multimedia tag, the analyzed user experience information is recorded automatically or when a specific signal is generated via a specific input by a user.

* * * * *